United States Patent
Kamiya

(10) Patent No.: US 9,415,566 B2
(45) Date of Patent: Aug. 16, 2016

(54) THREE-DIMENSIONAL FIBER-REINFORCED COMPOSITE MATERIAL

(71) Applicant: KABUSHIKI KAISHA TOYOTA JIDOSHOKKI, Kariya-shi, Aichi-ken (JP)

(72) Inventor: Ryuta Kamiya, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 37 days.

(21) Appl. No.: 14/422,220

(22) PCT Filed: Aug. 20, 2013

(86) PCT No.: PCT/JP2013/072157
§ 371 (c)(1),
(2) Date: Feb. 18, 2015

(87) PCT Pub. No.: WO2014/030631
PCT Pub. Date: Feb. 27, 2014

(65) Prior Publication Data
US 2015/0224737 A1    Aug. 13, 2015

(30) Foreign Application Priority Data
Aug. 21, 2012 (JP) ................................. 2012-182549

(51) Int. Cl.
*B32B 5/12* (2006.01)
*B32B 5/06* (2006.01)
(Continued)

(52) U.S. Cl.
CPC . *B32B 5/06* (2013.01); *B29C 70/10* (2013.01); *B29C 70/24* (2013.01); *B32B 5/024* (2013.01);
(Continued)

(58) Field of Classification Search
CPC ........... Y10T 428/24033; B29B 11/16; D03D 25/005
USPC ......................................................... 428/102
See application file for complete search history.

(56) References Cited

U.S. PATENT DOCUMENTS

2007/0232171 A1   10/2007   Maki et al.
2009/0096119 A1   4/2009    Joern et al.

FOREIGN PATENT DOCUMENTS

JP   62-5923 U       1/1987
JP   2007-152672 A   6/2007
(Continued)

OTHER PUBLICATIONS

International Search Report for PCT/JP2013/072157 dated Nov. 5, 2013.
(Continued)

*Primary Examiner* — Alexander Thomas
(74) *Attorney, Agent, or Firm* — Sughrue Mion, PLLC

(57) ABSTRACT

A three-dimensional fiber-reinforced composite includes a laminate having fiber bundle layers that are laminated in the laminating direction and include first and second outermost layers, primary and secondary retention yarns, and a binding yarn. The binding yarn includes a fold-back section, primary and secondary traverse yarn sections, a surface yarn section that extends along the surface of the second outermost layer in the direction substantially perpendicular to the secondary retention yarn, and a bifurcated section that is formed on the surface of the second outermost layer and connected to the primary and secondary traverse yarn sections. The bifurcated section is formed by crossing the surface yarn section that extends in opposite directions in the outside in the laminating direction of the secondary retention yarn.

6 Claims, 3 Drawing Sheets

(51) Int. Cl.
    *D04H 3/04*     (2012.01)
    *B29C 70/24*    (2006.01)
    *D03D 11/00*    (2006.01)
    *B29C 70/10*    (2006.01)
    *C08J 5/04*     (2006.01)
    *B32B 5/02*     (2006.01)

(52) U.S. Cl.
    CPC . *C08J 5/04* (2013.01); *D03D 11/00* (2013.01); *D04H 3/04* (2013.01); *B32B 2262/106* (2013.01); *D10B 2505/02* (2013.01); *Y10T 428/24132* (2015.01)

(56) References Cited

FOREIGN PATENT DOCUMENTS

| | | |
|---|---|---|
| JP | 2007-269034 A | 10/2007 |
| JP | 2007-291582 A | 11/2007 |
| JP | 2009-503274 A | 1/2009 |
| JP | 2009-73918 A | 4/2009 |

OTHER PUBLICATIONS

International Preliminary Report on Patentability dated Feb. 24, 2015, issued by the International Bureau of WIPO in counterpart International Application No. PCT/JP2013/072157.

THREE-DIMENSIONAL FIBER-REINFORCED COMPOSITE MATERIAL

CROSS REFERENCE TO RELATED APPLICATIONS

This application is a National Stage of International Application No. PCT/JP2013/072157 filed Aug. 20, 2013, claiming priority based on Japanese Patent Application No. 2012-182549 filed Aug. 21, 2012, the contents of all of which are incorporated herein by reference in their entirety.

TECHNICAL FIELD

The present disclosure relates to a three-dimensional fiber-reinforced composite formed by impregnating a laminate, which is bound together by a binding yarn in the lamination direction, with matrix resin.

BACKGROUND ART

Three-dimensional fiber-reinforced composites are used as light, strong materials. A three-dimensional fiber-reinforced composite includes a laminate formed by binding a plurality of fiber bundle layers with binding yarns in matrix resin. Thus, the three-dimensional fiber-reinforced composite has the physical characteristics (mechanical characteristic) superior to materials that only include matrix resin. The three-dimensional fiber-reinforced composite is therefore suitable for a structural component. In addition, the binding yarns allow the three-dimensional fiber-reinforced composite to be stronger in the lamination direction than a two-dimensional fiber-reinforced composite.

For example, Patent Document 1 discloses such a three-dimensional fiber-reinforced composite. As shown in FIG. 5, a three-dimensional fiber-reinforced composite 80 of Patent Document 1 includes a flat three-dimensional fabric 86. The three-dimensional fabric 86 includes in-plane direction yarns 83, which include a plurality of warp yarns 81 and a plurality of weft yarns 82, a plurality of out-of-plane direction yarns 84, which are perpendicular to the reference planes of the in-plane direction yarns 83, and a selvage yarn 85, which fixes the out-of-plane direction yarns 84. The three-dimensional fiber-reinforced composite 80 is formed by impregnating the three-dimensional fabric 86 with resin and hardening the resin.

PRIOR ART DOCUMENTS

Patent Documents

Patent Document 1: Japanese Laid-Open Patent Publication No. 2007-152672

SUMMARY OF THE INVENTION

Problems that the Invention is to Solve

In the three-dimensional fiber-reinforced composite 80, when the three-dimensional fabric 86 is stitched by inserting the out-of-plane direction yarn 84 through the three-dimensional fabric 86, the out-of-plane direction yarn 84 is pulled in directions along the plane of the three-dimensional fabric 86. The pulling creates a large gap in the section where the out-of-plane direction yarn 84 extends in opposite directions (bifurcated section). When impregnating the three-dimensional fabric 86, the resin remains in the gap and forms a resin pool 87. The resin pool 87 lacks fibers and is thus mechanically weak in the three-dimensional fiber-reinforced composite 80. Thus, it is desired to reduce the size of the resin pool 87.

It is an object of the present disclosure to provide a three-dimensional fiber-reinforced composite capable of reducing the size of resin pools in bifurcated sections.

Means for Solving the Problems

To achieve the foregoing objective and in accordance with one aspect of the present invention, a three-dimensional fiber-reinforced composite is provided that includes a laminate, a matrix resin, a primary retention yarn, a secondary retention yarn, and a binding yarn. The laminate includes fiber bundle layers that are layered in a lamination direction. The fiber bundle layers include a first outermost layer and a second outermost layer. The laminate is impregnated with the matrix resin. The primary retention yarn is located along a surface of the first outermost layer. The secondary retention yarn is located along a surface of the second outermost layer. The binding yarn binds the fiber bundle layers in the lamination direction. The binding yarn includes a fold-back section, a primary traverse yarn section and a secondary traverse yarn section, surface yarn sections, and a bifurcated section. The fold-back section is folded back such that the fold-back section runs on an outer side of the primary retention yarn in the lamination direction. The primary traverse yarn section and the secondary traverse yarn section are continuous with the fold-back section and extended in the lamination direction between the primary retention yarn and the secondary retention yarn in the laminate. The surface yarn sections extend in directions that are substantially perpendicular to the secondary retention yarn and along the surface of the second outermost layer. The bifurcated section is formed on the surface of the second outermost layer and continuous with the primary traverse yarn section and the secondary traverse yarn section. The bifurcated section is formed by the surface yarn sections that extend in opposite directions from the secondary retention yarn on the outer side of the secondary retention yarn in the lamination direction and cross each other.

In the three-dimensional fiber-reinforced composite, when the binding yarn is pulled in the directions along the plane of the laminate during stitching of the binding yarn, the portions of the surface yarn sections that form the bifurcated section are pulled in opposite directions to squeeze the secondary retention yarn. However, the secondary retention yarn limits movement of the surface yarn sections. Even if the surface yarn sections are pulled, the friction resistance between the surface yarn sections and the secondary retention yarn limits movement of the surface yarn sections. As a result, spreading of the bifurcated section is limited even when the binding yarn is pulled.

The primary traverse yarn section and the secondary traverse yarn section may cross each other between the primary retention yarn and the secondary retention yarn.

Thus, when the binding yarn is pulled in the directions along the plane of the laminate, the primary traverse yarn section and the secondary traverse yarn section, which cross each other, are pulled to squeeze the primary retention yarn. Even if the primary and secondary traverse yarn sections are pulled, the friction resistance between the primary and secondary traverse yarn sections and the primary retention yarn limits movement of the primary and secondary traverse yarn sections. As a result, spreading of the bifurcated sections is limited even when the binding yarn is pulled.

The laminate may include a holding layer located in the vicinity of the bifurcated section in the lamination direction.

Thus, even if the binding yarn is pulled in the directions along the plane of the laminate during stitching of the binding yarn, the holding layer maintains the shape of the bifurcated section. This limits spreading of the bifurcated section.

MODES FOR CARRYING OUT THE INVENTION

Referring to FIGS. 1 to 5, one embodiment of a three-dimensional fiber-reinforced composite will now be described.

Figure 2:
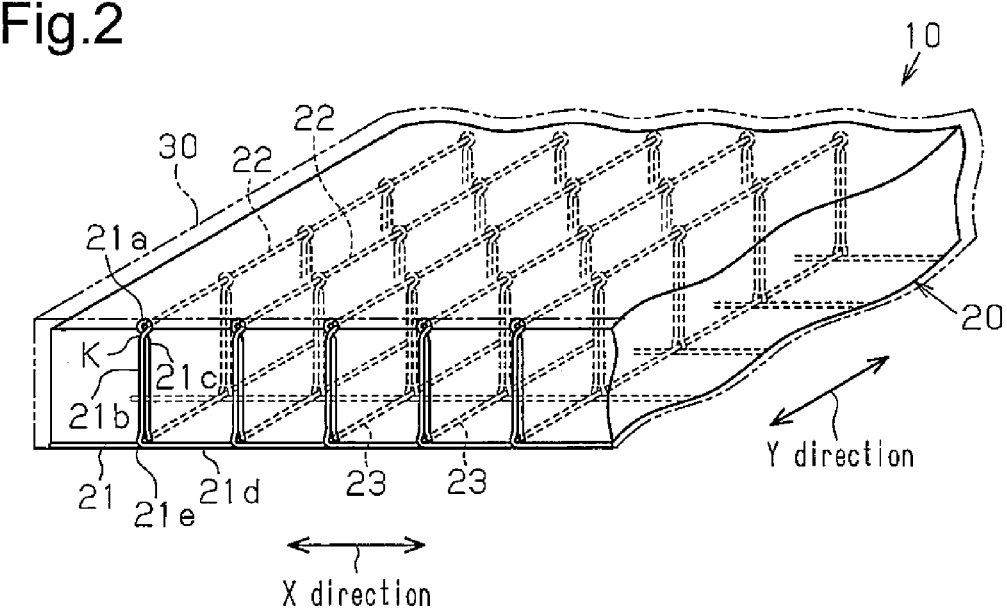
FIG. 2 is a perspective view showing the three-dimensional fiber-reinforced composite of the embodiment.
Figure 3:
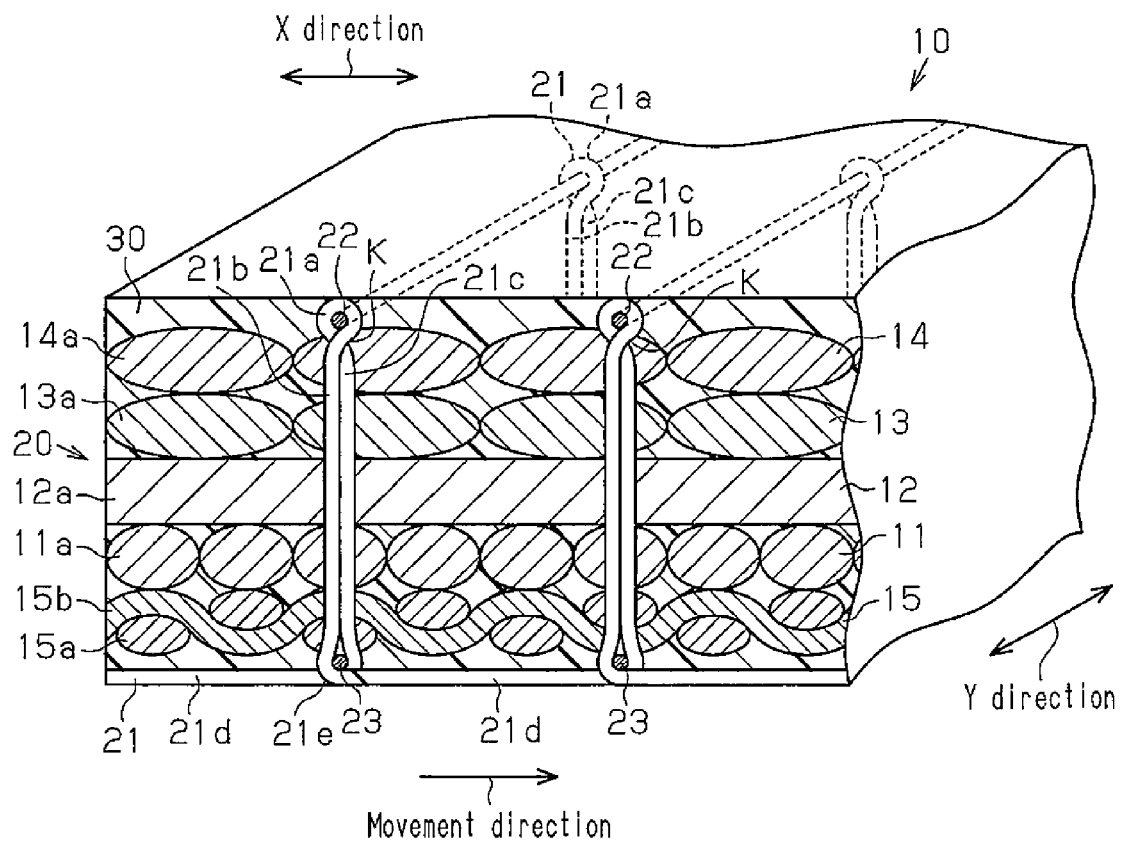
FIG. 3 is a cross-sectional view showing the three-dimensional fiber-reinforced composite of FIG. 2.

As shown in FIGS. 2 and 3, a three-dimensional fiber-reinforced composite 10 includes a laminate 20 and matrix resin 30. The laminate 20 is formed by layering a plurality of sheet-shaped fiber bundle layers, namely, first to fourth reinforcement fiber bundle layers 11 to 14, and a holding layer 15 and by binding the first to fourth reinforcement fiber bundle layers 11 to 14 and the holding layer 15 with binding yarns 21. The matrix resin 30 is formed by impregnating the laminate 20 with resin.

Figure 1:
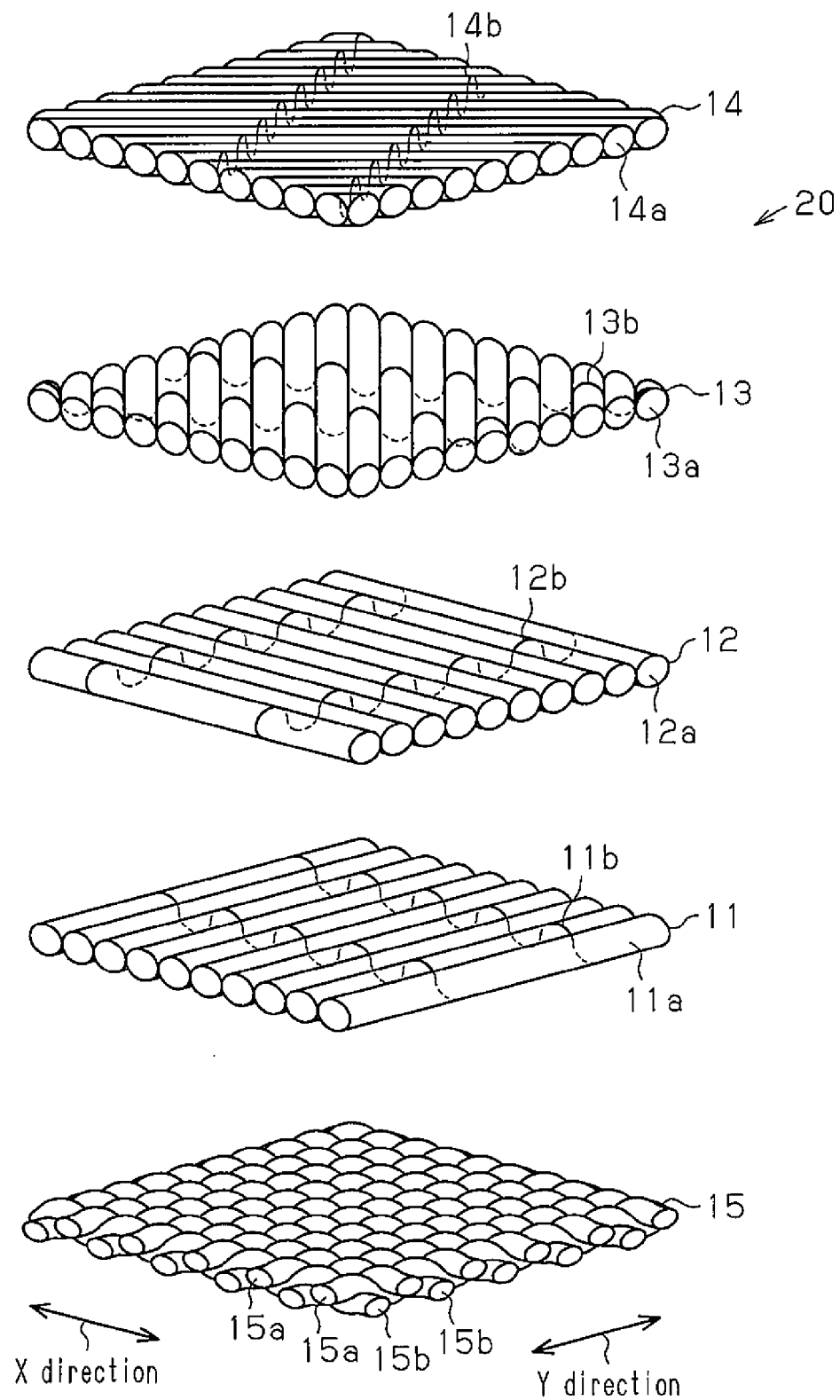
FIG. 1 is an exploded perspective view showing a laminate of a three-dimensional fiber-reinforced composite of one embodiment.

As shown in FIG. 1, the first to fourth reinforcement fiber bundle layers 11 to 14 include sets of first to fourth reinforcement fiber bundles 11a to 14a, respectively. The first to fourth reinforcement fiber bundles 11a to 14a extend in the same direction in the respective layers. The term "reinforcement fiber bundles" refers to fiber bundles that reinforce the matrix resin 30 of the three-dimensional fiber-reinforced composite 10 when the first to fourth reinforcement fiber bundle layers 11 to 14 are used as the fiber base of the three-dimensional fiber-reinforced composite 10. In the present embodiment, carbon fibers are used as the reinforcement fibers. In the following descriptions, of the directions along the plane of the three-dimensional fiber-reinforced composite 10, the direction along one side of the three-dimensional fiber-reinforced composite 10 is defined as the X direction, and the direction perpendicular to the X direction is defined as the Y direction. Further, in the three-dimensional fiber-reinforced composite 10, the direction perpendicular to the X direction and the Y direction and in which the first to fourth reinforcement fiber bundle layers 11 to 14 are layered is defined as the lamination direction.

As shown in FIG. 1, the first reinforcement fiber bundle layer 11 is formed by the first reinforcement fiber bundles 11a, which extend linearly in parallel to one another. The first reinforcement fiber bundles 11a have a flattened cross-section. The first reinforcement fiber bundles 11a extend at an angle of 90 degrees to the X direction of the three-dimensional fiber-reinforced composite 10. The first reinforcement fiber bundles 11a are joined together by support yarns 11b extending in the arrangement direction of the first reinforcement fiber bundles 11a.

The second reinforcement fiber bundle layer 12 is formed by the second reinforcement fiber bundles 12a, which extend linearly in parallel to one another. The second reinforcement fiber bundles 12a have a flattened cross-section. The second reinforcement fiber bundles 12a extend in the X direction of the three-dimensional fiber-reinforced composite 10. The second reinforcement fiber bundles 12a are joined together by support yarns 12b extending in the arrangement direction of the second reinforcement fiber bundles 12a.

The third reinforcement fiber bundle layer 13 is formed by the third reinforcement fiber bundles 13a, which extend linearly in parallel to one another. The third reinforcement fiber bundles 13a have a flattened cross-section. The third reinforcement fiber bundles 13a extend at an angle of +45 degrees relative to the X direction of the three-dimensional fiber-reinforced composite 10. The third reinforcement fiber bundles 13a are joined together by support yarns 13b extending in the arrangement direction of the third reinforcement fiber bundles 13a.

The fourth reinforcement fiber bundle layer 14 is formed by the fourth reinforcement fiber bundles 14a, which extend linearly in parallel to one another. The fourth reinforcement fiber bundles 14a have a flattened cross-section. The fourth reinforcement fiber bundles 14a extend at an angle of −45 degrees relative to the X direction of the three-dimensional fiber-reinforced composite 10. The fourth reinforcement fiber bundles 14a are joined together by support yarns 14b extending in the arrangement direction of the fourth reinforcement fiber bundles 14a.

The holding layer 15 is a plain weave, in which each of warp yarns 15a (primary yarns) and weft yarns 15b (secondary yarns) are interlaced one by one. Each warp yarn 15a is a fiber bundle. The warp yarns 15a extend parallel to one another in the Y direction. Each weft yarn 15b is also a fiber bundle. The weft yarns 15b extend in parallel to one another in the direction (X direction) that intersects (perpendicularly) the warp yarns 15a. The fiber bundles of the warp yarns 15a and the weft yarns 15b are made of carbon fibers.

As shown in FIGS. 2 and 3, the laminate 20 is formed by the first to fourth reinforcement fiber bundle layers 11 to 14 and the holding layer 15 that are layered and bound in the lamination direction by a plurality of binding yarns 21. A plurality of primary retention yarns 22 are arranged on the fourth reinforcement fiber bundle layer 14, which is the first outermost layer of the two outermost layers of the laminate 20 in the lamination direction. The primary retention yarns 22 extend in parallel to one another in the Y direction and are arranged at intervals in the X direction. A plurality of secondary retention yarns 23 are arranged on the surface of the holding layer 15, which is the second outermost layer. The secondary retention yarns 23 extend in parallel to one another in the Y direction and are arranged at intervals in the X direction. The secondary retention yarns 23 extend in the same direction as the primary retention yarns 22 and face the primary retention yarns 22 in the lamination direction. The binding yarns 21, the primary retention yarns 22, and the secondary retention yarns 23 are made of carbon fibers.

The details of the binding yarns 21 are given below. The binding yarns 21 are stitched in the direction (X direction) that extends along the planes of the holding layer 15 and the fourth reinforcement fiber bundle layer 14 and is perpendicular to the direction in which the first and secondary retention yarns 22 and 23 extend. The direction in which the binding yarns 21 are stitched and extended is defined as a movement direction.

Each of the binding yarns 21 is inserted from the surface of the holding layer 15 into the laminate 20 at a position forward of a secondary retention yarn 23 in the movement direction. After passing through the laminate 20 in the lamination direction, the binding yarn 21 is pulled out of the surface of the fourth reinforcement fiber bundle layer 14 at a position rearward of a primary retention yarn 22 in the movement direction. The binding yarn 21 is folded back on the outer side of the primary retention yarn 22 in the lamination direction and then inserted into the laminate 20 at a position forward of the primary retention yarn 22 in the movement direction.

Then, after passing through the laminate 20 in the lamination direction, the binding yarn 21 is pulled out of the surface of the holding layer 15 at a position rearward of the secondary retention yarn 23 in the movement direction. The binding yarn 21 then runs on the outer side of the secondary retention yarn 23 in the lamination direction and extends in the movement direction. Thus, the single binding yarn 21 is repeatedly folded back on the surface of the fourth reinforcement fiber bundle layer 14 and repeatedly inserted into and pulled out of the surface of the holding layer 15. Accordingly, the single binding yarn 21 binds the laminate 20 together at a plurality of positions.

As shown in FIG. 3, when the binding yarns 21 are inserted through the laminate 20, each binding yarn 21 includes fold-back sections 21a that are folded back on the outer sides of the primary retention yarns 22. The binding yarn 21 also includes primary traverse yarn sections 21b and secondary traverse yarn sections 21c that are continuous with the fold-back sections 21a and extended in the laminate 20 in the lamination direction between the primary retention yarns 22 and the secondary retention yarns 23. Furthermore, the binding yarn 21 includes surface yarn sections 21d that extend along the surface of the holding layer 15 in the directions perpendicular to the primary retention yarns 22 and the secondary retention yarns 23. The portions of two surface yarn sections 21d that extend on the surface of the holding layer 15 in opposite directions from a secondary retention yarn 23 form a bifurcated section 21e. Sets of a fold-back section 21a, a primary traverse yarn section 21b, a secondary traverse yarn section 21c, and a bifurcated section 21e are arranged at uniform intervals in the X direction in the similar manner as the primary retention yarns 22 and the secondary retention yarns 23.

Each bifurcated section 21e is formed by the surface yarn sections 21d that extend in opposite directions and cross each other on the outer side of the associated secondary retention yarn 23. The secondary retention yarn 23 is surrounded by the associated surface yarn sections 21d, the primary traverse yarn section 21b and the secondary traverse yarn section 21c. On the inner side of each primary retention yarn 22, the primary traverse yarn section 21b and the secondary traverse yarn section 21c cross each other and form a crossing section K. Thus, the primary retention yarn 22 is surrounded by the fold-back section 21a and the primary and secondary traverse yarn sections 21b and 21c, which are continuous with the fold-back section 21a and form the crossing section K. The formation of the crossing section K results in one twist of the binding yarn 21 between the primary retention yarn 22 and the secondary retention yarn 23. In addition, the binding yarn 21 couples the primary retention yarns 22 to the secondary retention yarns 23 and reinforces the laminate 20 in the lamination direction.

The laminate 20 that is bound together in the lamination direction by the primary retention yarns 22, the secondary retention yarns 23, and the binding yarns 21 is placed in a mold that is used in the resin transfer molding (RTM) method. Thermosetting resin is introduced into the mold and impregnated into the reinforcement fiber bundle layers 11 to 14, the holding layer 15, the binding yarns 21, the primary retention yarns 22, and the secondary retention yarns 23 of the laminate 20. The thermosetting resin is then heated and hardened to form the matrix resin 30. As a result, the matrix resin 30 is hardened around the reinforcement fiber bundle layers 11 to 14, the holding layer 15, the binding yarns 21, the primary retention yarns 22, and the secondary retention yarns 23 to form the three-dimensional fiber-reinforced composite 10.

Operation of the three-dimensional fiber-reinforced composite 10 will now be described.

The surface yarn sections 21d, which extend in opposite directions from each secondary retention yarn 23, cross each other on the outer side of the secondary retention yarns 23 in the lamination direction. When the binding yarn 21 is pulled to the directions along the plane of the laminate 20 during stitching of the laminate 20 with the binding yarn 21, the portions of the surface yarn sections 21d that form the bifurcated section 21e are pulled in opposite directions. However, the secondary retention yarn 23 limits movement of the surface yarn sections 21d. Even if the surface yarn sections 21d are pulled, the friction resistance between the surface yarn sections 21d and the secondary retention yarn 23 limits movement of the surface yarn sections 21d. As a result, spreading of the bifurcated section 21e is limited.

The above described embodiment has the following advantages.

(1) In the laminate 20, which is bound together in the lamination direction by the binding yarns 21, the primary retention yarns 22 are arranged on the surface of the fourth reinforcement fiber bundle layer 14, and the secondary retention yarns 23 are arranged on the holding layer 15. In addition, the bifurcated sections 21e of the binding yarns 21 are formed by the surface yarn sections 21d, which cross on the outer side of the secondary retention yarns 23. Thus, even though the surface yarn sections 21d, which form the bifurcated section 21e, are pulled in opposite directions when the laminate 20 is bound together by the binding yarns 21, the secondary retention yarns 23 limit movements of the surface yarn sections 21d. Accordingly, even though the matrix resin 30 is impregnated in the bifurcated sections 21e and forms resin pools, the resin pools are smaller than those of a structure in which the surface yarn sections 21d do not cross at the bifurcated sections 21e. This allows for a uniform fiber volume content in the three-dimensional fiber-reinforced composite 10, thereby preventing reduction in the mechanical strength of the three-dimensional fiber-reinforced composite 10. Furthermore, spreading of the bifurcated section 21e is limited even when the binding yarn 21 is pulled. This avoids a situation in which the binding yarn 21 is pulled insufficiently so as to prevent spreading of the bifurcated section 21e.

(2) Even though the surface yarn sections 21d are pulled, the friction resistance between the surface yarn sections 21d and the secondary retention yarns 23 limits movements of the surface yarn sections 21d. This limits spreading of the bifurcated sections 21e.

(3) The primary traverse yarn section 21b and the secondary traverse yarn section 21c cross each other between the primary retention yarn 22 and the secondary retention yarn 23 in the lamination direction of the laminate 20 and form a crossing section K. Thus, when the binding yarn 21 is pulled in the directions along the plane of the laminate 20, the primary traverse yarn section 21b and the secondary traverse yarn section 21c, which cross each other, are pulled and squeeze the primary retention yarn 22. In addition to the crossing of the surface yarn sections 21d on the outer side of each secondary retention yarns 23, the crossing of the primary traverse yarn section 21b and the secondary traverse yarn section 21c effectively limits spreading of the bifurcated section 21e.

(4) The two outermost layers of the laminate 20 include the holding layer 15. The binding yarns 21 bind the holding layer 15 to the first to fourth reinforcement fiber bundle layers 11 to 14. The bifurcated sections 21e of the binding yarns 21 are located near and held by the holding layer 15. The holding layer 15 can retain its shape. Thus, when the binding yarns 21 are stitched, even if the binding yarns 21 are pulled to the directions along the plane of the laminate 20, the retention of the shape of the holding layer 15 retains the shape of the bifurcated sections 21e, thereby liming spreading of the bifurcated sections 21e. As a result, in addition to the crossing of the surface yarn sections 21d on the outer side of each secondary retention yarn 23 and the crossing of the primary traverse yarn sections 21b and the secondary traverse yarn sections 21c, the arrangement of the holding layer 15 effectively limits spreading of the bifurcated sections 21e.

(5) The holding layer 15 is a plain-woven fabric of the warp yarns 15a and the weft yarns 15b. Thus, when the binding yarns 21 are pulled, the friction resistance at the intersections between the warp yarns 15a and the weft yarns 15b limits spreading of the bifurcated sections 21e.

(6) The holding layer 15 is a plain-woven fabric of the warp yarns 15a and the weft yarns 15b. The warp yarns 15a and the weft yarns 15b limit enlargement of the space defined by the warp yarns 15a and the weft yarns 15b. Thus, the holding layer 15 does not expand even when the binding yarns 21 are pulled. This limits spreading of the bifurcated sections 21e.

(7) The holding layer 15 is located at the outermost position in the laminate 20. The holding layer 15 is the closest to the bifurcated section 21e and thus capable of effectively limiting spreading of the bifurcated sections 21e when the binding yarn 21 is pulled.

(8) The primary retention yarns 22 and the secondary retention yarns 23 are made of carbon fibers. Thus, the primary retention yarns 22 and the secondary retention yarns 23 resist breaking when pulled by the binding yarns 21. This maintains the binding of the laminate 20.

(9) The first to fourth reinforcement fiber bundle layers 11 to 14, the holding layer 15, the binding yarns 21, the primary retention yarns 22, and the secondary retention yarns 23 are made of carbon fibers. Thus, the laminate 20 is made only of carbon materials. This prevents reduction of the strength of the three-dimensional fiber-reinforced composite 10, which would otherwise be caused by a presence of non-carbon materials.

The above described embodiment may be modified as follows.

Figure 4:
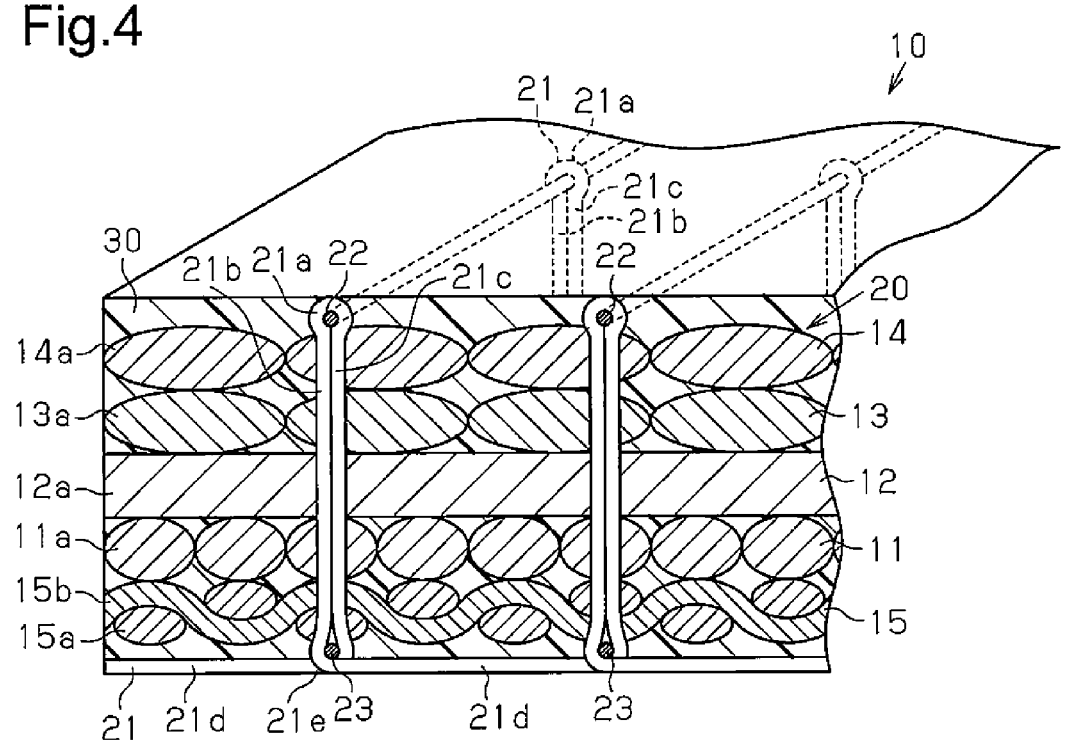
FIG. 4 is a cross-sectional view showing a three-dimensional fiber-reinforced composite of a modification.
Figure 5:
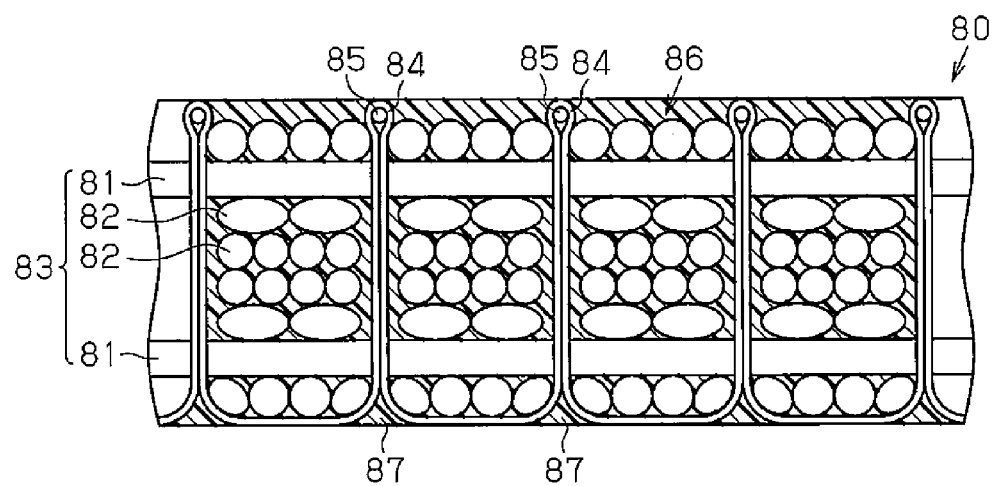
FIG. 5 is a diagram showing a prior art structure.

In the illustrated embodiment, the crossing sections K of the primary traverse yarn sections 21b and the secondary traverse yarn sections 21c are formed between the respective primary retention yarns 22 and the secondary retention yarns 23 in the laminate 20. However, as shown in FIG. 4, the crossing sections K may be omitted.

In the illustrated embodiment, the primary retention yarns 22 and the secondary retention yarns 23 extend in the same direction. However, the primary retention yarns 22 and the secondary retention yarns 23 may extend in directions that differ to some extent.

The fibers that form the binding yarns 21, the primary retention yarns 22, the secondary retention yarns 23, and the first to fourth reinforcement fiber bundles 11a to 14a are not limited to carbon fibers. Depending on the required physical properties of the three-dimensional fiber-reinforced composite 10, high-strength organic fibers such as aramid fibers, poly-p-phenylenebenzobisoxazole fibers, and ultrahigh molecular weight polyethylene fibers, or inorganic fibers such as glass fibers and ceramic fibers may be used.

In the illustrated embodiment, the warp yarns 15a are the primary yarns, and the weft yarns 15b are the secondary yarns. However, the warp yarns 15a may be the secondary yarns, and the weft yarns 15b may be the primary yarns.

The holding layer 15 may be made of glass fibers. When the three-dimensional fiber-reinforced composite 10 is used in contact with an aluminum component, the holding layer 15 that is located at the outermost position in the laminate 20 and made of glass fibers can limit electrolytic corrosion.

The holding layer 15 may be a satin or twill fabric.

The holding layer 15 may be a non-woven fabric or a plastic film.

In the illustrated embodiment, the holding layer 15 is located at the outermost position in the laminate 20. However, as long as the holding layer 15 is closer to the bifurcated sections 21e than the retention yarns 22 in the laminate 20, the holding layer 15 may be located inward of the outermost layer of the laminate 20 in the lamination direction.

In the illustrated embodiment, the first to fourth reinforcement fiber bundle layers 11 to 14 are joined by the support yarns 11b to 14b, respectively. However, the present invention is not limited to such a structure. For example, fusible yarns may be arranged on one side of each of the first to fourth reinforcement fiber bundle layers 11 to 14 to join together each set of the reinforcement fiber bundles 11a to 14a. Alternatively, in the first to fourth reinforced fiber bundle layers 11 to 14, pins may be arranged at the opposite axial ends of each of the reinforcement fiber bundles 11a to 14a, and a joining yarn may engage the pins to join together each set of the reinforcement fiber bundles 11a to 14a.

In the illustrated embodiment, thermosetting resin is used as the matrix resin 30. However, other types of resin may be used.

Each of the numbers of the binding yarns 21, the primary retention yarns 22, and the secondary retention yarns 23 may be one.

The laminate 20 may include two or three reinforcement fiber bundle layers, or may include five or more reinforcement fiber bundle layers.

The three-dimensional fiber-reinforced composite 10, which includes the laminate 20 and the matrix resin 30 may be made by a method other than the RTM method.

The invention claimed is:

1. A three-dimensional fiber-reinforced composite comprising:
a laminate including fiber bundle layers that are layered in a lamination direction, wherein the fiber bundle layers include a first outermost layer and a second outermost layer;
a matrix resin with which the laminate is impregnated;
a primary retention yarn located along a surface of the first outermost layer;
a secondary retention yarn located along a surface of the second outermost layer; and
a binding yarn that binds the fiber bundle layers in the lamination direction, wherein the binding yarn includes:
a fold-back section that is folded back such that the fold-back section runs on an outer side of the primary retention yarn in the lamination direction;
a primary traverse yarn section and a secondary traverse yarn section that are continuous with the fold-back section and extended in the lamination direction between the primary retention yarn and the secondary retention yarn in the laminate;

surface yarn sections extending in directions that are substantially perpendicular to the secondary retention yarn and along the surface of the second outermost layer; and a bifurcated section that is formed on the surface of the second outermost layer and continuous with the primary traverse yarn section and the secondary traverse yarn section, and the bifurcated section is formed by the surface yarn sections that extend in opposite directions from the secondary retention yarn on the outer side of the secondary retention yarn in the lamination direction and cross each other.

2. The three-dimensional fiber-reinforced composite according to claim 1, wherein the primary traverse yarn section and the secondary traverse yarn section cross each other between the primary retention yarn and the secondary retention yarn.

3. The three-dimensional fiber-reinforced composite according to claim 1, wherein the laminate includes a holding layer located in the vicinity of the bifurcated section in the lamination direction.

4. The three-dimensional fiber-reinforced composite according to claim 3, wherein the holding layer is the second outermost layer.

5. The three-dimensional fiber-reinforced composite according to claim 3, wherein the holding layer is a woven fabric including primary yarns that are arranged in parallel to one another and secondary yarns that are arranged parallel to one another and extended in a direction that intersects the primary yarns, and each of the primary and secondary yarns is a fiber bundle.

6. The three-dimensional fiber-reinforced composite according to claim 3, wherein the fiber bundle layers, the primary retention yarn, the secondary retention yarn, the binding yarn, and the holding layer are made of carbon fibers.

* * * * *